(12) United States Patent  
Giovanardi et al.

(10) Patent No.: US 12,323,264 B2  
(45) Date of Patent: *Jun. 3, 2025

(54) DYNAMIC COMMUNICATION SESSION TOPIC GENERATION

(71) Applicant: Zoom Communications, Inc., San Jose, CA (US)

(72) Inventors: Davide Giovanardi, Stanford, CA (US); Helgi Hilmarsson, Stanford, CA (US); Stephen Muchovej, Bishop, CA (US); Mengxiao Qian, Santa Clara, CA (US); Xiaoli Song, Sunnyvale, CA (US); Min Xiao-Devins, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,184

(22) Filed: Dec. 13, 2023

(65) Prior Publication Data

US 2024/0113906 A1 Apr. 4, 2024

Related U.S. Application Data

(63) Continuation of application No. 17/734,038, filed on Apr. 30, 2022, now Pat. No. 11,876,633.

(51) Int. Cl.
*H04L 12/18* (2006.01)
*G10L 15/04* (2013.01)
(Continued)

(52) U.S. Cl.
CPC .......... *H04L 12/1831* (2013.01); *G10L 15/04* (2013.01); *G10L 15/08* (2013.01);
(Continued)

(58) Field of Classification Search
CPC . H04L 12/1831; H04L 12/1818; G10L 15/04; G10L 15/08; G10L 15/1815; G10L 15/26; G10L 2015/088

See application file for complete search history.

(56) References Cited

U.S. PATENT DOCUMENTS 10,374,816 B1 8/2019 Leblang et al.
2012/0284016 A1 11/2012 Tamura et al.
(Continued)

OTHER PUBLICATIONS

International Search Report and Written Opinion mailed on Jul. 19, 2023 in corresponding PCT Application No. PCT/US2023/019594.
(Continued)

*Primary Examiner* — Raqiul A Choudhury
(74) *Attorney, Agent, or Firm* — Young Basile Hanlon & MacFarlane, P.C.

(57) ABSTRACT

Methods and systems provide for dynamically generated topic segments for a communication session. In one embodiment, the system connects to a communication session with a number of participants; receives a list of topics; receives a transcript of a conversation between the participants produced during the communication session, the transcript including timestamps for a number of utterances associated with speaking participants; for each topic in the list of topics, segments the utterances into one or more topic segments based on the topic; for each of the segments, classifies whether the topic segment is related to the topic, and transmits, to one or more client devices, a list of the topic segments for the communication session.

20 Claims, 10 Drawing Sheets

(51) Int. Cl.
*G10L 15/08* (2006.01)
*G10L 15/18* (2013.01)
*G10L 15/26* (2006.01)

(52) U.S. Cl.
CPC .......... *G10L 15/1815* (2013.01); *G10L 15/26* (2013.01); *H04L 12/1818* (2013.01); *G10L 2015/088* (2013.01)

(56) References Cited

U.S. PATENT DOCUMENTS

| | | |
|---|---|---|
| 2012/0296914 A1 | 11/2012 | Romanov et al. |
| 2012/0323575 A1 | 12/2012 | Gibbon et al. |
| 2015/0332168 A1 | 11/2015 | Bhagwat et al. |
| 2016/0072862 A1 | 3/2016 | Bader-Natal et al. |
| 2016/0352912 A1 | 12/2016 | Dhawan et al. |
| 2017/0062010 A1* | 3/2017 | Pappu ................ G11B 27/105 |
| 2017/0263265 A1 | 9/2017 | Ashikawa et al. |
| 2018/0191912 A1 | 7/2018 | Cartwright et al. |
| 2018/0239822 A1 | 8/2018 | Reshef et al. |
| 2020/0065379 A1 | 2/2020 | Shires et al. |
| 2020/0342182 A1 | 10/2020 | Johnson Premkumar et al. |
| 2021/0027783 A1 | 1/2021 | Szymanski et al. |
| 2021/0210097 A1 | 7/2021 | Diamant et al. |
| 2022/0231873 A1 | 7/2022 | Werfelli et al. |
| 2022/0383865 A1* | 12/2022 | McDermid ......... G10L 15/1822 |

OTHER PUBLICATIONS

Marti A Hearst: "TextTiling", Computational Linguistics, M I T Press, US, vol. 23, No. 1, Mar. 1, 1997 (Mar. 1, 1997), pp. 33-64, XP058176768, ISSN: 0891-2017 section 5.2.1 in particular.

Bernadette Sharp et al: "Text segmentation of spoken meeting transcripts", International Journal of Speech Technology, Kluwer Academic Publishers, BO, vol. 11, No. 3-4, Nov. 12, 2009 (Nov. 12, 2009), pp. 157-165, XP019749234, ISSN: 1572-8110 section 4.2 abstract.

Gupta Vidhi et al: "A Comparative Study of the Performance of Unsupervised Text Segmentation Techniques on Dialogue Transcripts", 2020 Systems and Information Engineering Design Symposium (SIEDS), IEEE, Apr. 24, 2020 (Apr. 24, 2020), pp. 1-6, XP033776421, DOI:10.1109/SIEDS49339.2020.9106639 [retrieved on Jun. 1, 2020] the whole document.

* cited by examiner

Um I I think uh for next meet we c you two can present a real design. Oh so drawing it on the board. And then we tow ah only have to t to decide the general function uh. Let let's say next meeting w you produce two designs, one one ? ah we will uh one less advanced and one more advanced and with the cost price.

Yeah of course uh to uh to have icons to explain the different functions. Yeah right right, and maybe we should use colours. I think we have to talk also about uh the the materials for uh well it's just uh about our first ideas n ce so I think individually we'll have to uh come up with ideas for the next meeting about these materials and markets etcetera. Already thought about something tha well thirty minutes we have. This is about uh what we are going to uh d o uh. You'll get specific instructions when you're back in your room so uh it's uh logical uh. Oh and uh that's uh th at's all.

Um you say that I don't remember by heart but thirty per cent of the tested people say that's it's quite difficult to to to use the remote control. Do they say that this is difficult but for the same reason or do they have other reaso n? Or to to maybe to keep in mind maybe to access to that menu you should do something like that. It's not intuitive fi rst. But yeah maybe and what about if we design a remote control which can be configure as you want? You say that i w ant, I have six button For uh speech recognition. Okay so we can take this into account. So who think it would be good to go for uh like spe ech recognition? But we don't have time to market.

FIG. 5A

[ 'Ma I I think uh for next meet we o you two can present a real design.',
'Uh so drawing it on the board.',
'And then we now sh only have to t to decide the general function uh.',
'Let let's say next meeting w you produce two designs, one one',
'Yeah we will uh',
'one less advanced and one more advanced and with the cost price.',
'Yeah of course uh to uh to uh to have icons to explain the different functions.',
'Yeah right right, and maybe we should use colours.'
'I think we have to talk also about uh the the materials for um',
'Well it's just uh about our first ideas now so I think individually we'll have to uh come up with ideas for the next meeting about these materials and markets etcetera.',
'already thought about something that',
'Well thirty minutes we have.',
'This is about uh what we are going to uh do uh.',
'you'll get specific instructions when you're back in your room',
'so uh it's uh logical uh.',
'Oh and uh that's uh that's all.',
'Um you say that I don't remember by heart but thirty per cent',
'of the tested people say that's it's quite difficult to to to use the remote control.',
'Do they say that this is difficult but for the same reason or do they have other reason?',
'To to maybe to keep in mind maybe to access to that menu you should do something like that.',
'It's not intuitive first.',
'But yeah maybe and what about if we design a remote control which can be configure as you want?',
'You say that I want, I have six button',
'For uh speech recognition.',
'Okay so we can take this into account.',
'So who think it would be good to go for uh like speech recognition?',
'but we don't have time to market.',

FIG. 5B

DYNAMIC COMMUNICATION SESSION TOPIC GENERATION

CROSS-REFERENCE TO RELATED APPLICATION(S)

This application is a continuation of U.S. patent application Ser. No. 17/734,038, filed Apr. 30, 2022, the entire disclosure of which is hereby incorporated by reference.

FIELD

The present invention relates generally to digital communication, and more particularly, to systems and methods for providing dynamically generated topic segments for a communication session.

SUMMARY

The appended claims may serve as a summary of this application.

BRIEF DESCRIPTION OF THE DRAWINGS

The present invention relates generally to digital communication, and more particularly, to systems and methods for providing dynamically generated topic segments for a communication session.

The present disclosure will become better understood from the detailed description and the drawings, wherein:

FIG. 5A is a diagram illustrating an example of topics detected in an excerpt of a transcript, in accordance with some embodiments.

FIG. 5B is a diagram illustrating an example of utterances detected in an excerpt of a transcript, in accordance with some embodiments.

DETAILED DESCRIPTION

Figure 1A:
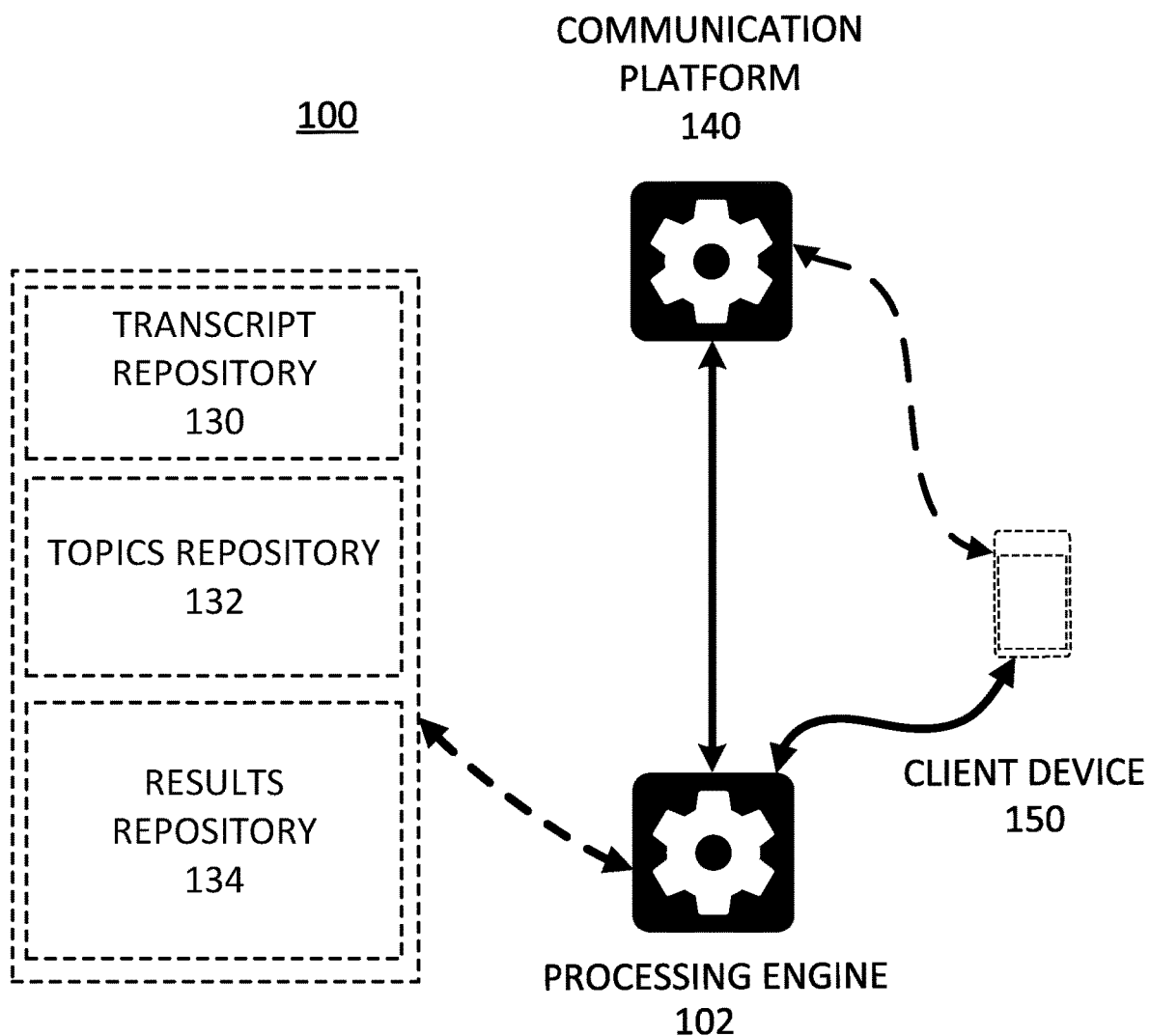
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, when navigating through recorded video of a communication session, reviewing a sales meeting can be difficult and time consuming, as sales meetings can often run for 30-60 minutes, and a large amount of time is often spent on scrolling through the meeting to find the portion or topic the user is looking for. Additionally, past sales meetings can be difficult to search for, as there is no way to search for specific topics of discussion for specific prospective customers.

Thus, there is a need in the field of digital communication tools and platforms to create a new and useful system and method for providing dynamically generated topic segments for a communication session, particularly based on a transcript and a list of topics. The source of the problem, as discovered by the inventors, is a lack of ability to dynamically segment a meeting into topic segments and to dynamically detect topics related to the content of the meeting in each segment, given a transcript of the meeting and a list of topics.

In one embodiment, the system connects to a communication session with a number of participants; receives a list of topics; receives a transcript of a conversation between the participants produced during the communication session, the transcript including timestamps for a number of utterances associated with speaking participants; for each topic in the list of topics, segments the utterances into one or more topic segments based on the topic; for each of the segments, classifies whether the topic segment is related to the topic, and transmits, to one or more client devices, a list of the topic segments for the communication session.

A meeting, such as a communication session facilitated via a remote communication platform, typically contains several topics or different aspects. A system for dynamic generation of topic segments, in accordance with some embodiments, functions to automatically segment a communication session into topic segments based on the content of the session and topics, then automatically determine whether each of the topic segments are related in meaning to each topic.

In some embodiments, inputs for the system include at least a meeting transcript which contains a list of utterances with timing and speaker information, and a submitted list of topics which may be relevant to the meeting and/or participants. In some embodiments, at least one output for the system includes a list of topic segments. In some embodiments, each segment in the list may additionally include one or more of a start time, end time, and/or dynamically generated title.

An exemplary method for the system includes two key components: topic segmentation, and topic classification or detection. Both of these components will be described in further detail below.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a transcript repository 130, a topics repository 132, and/or a results repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
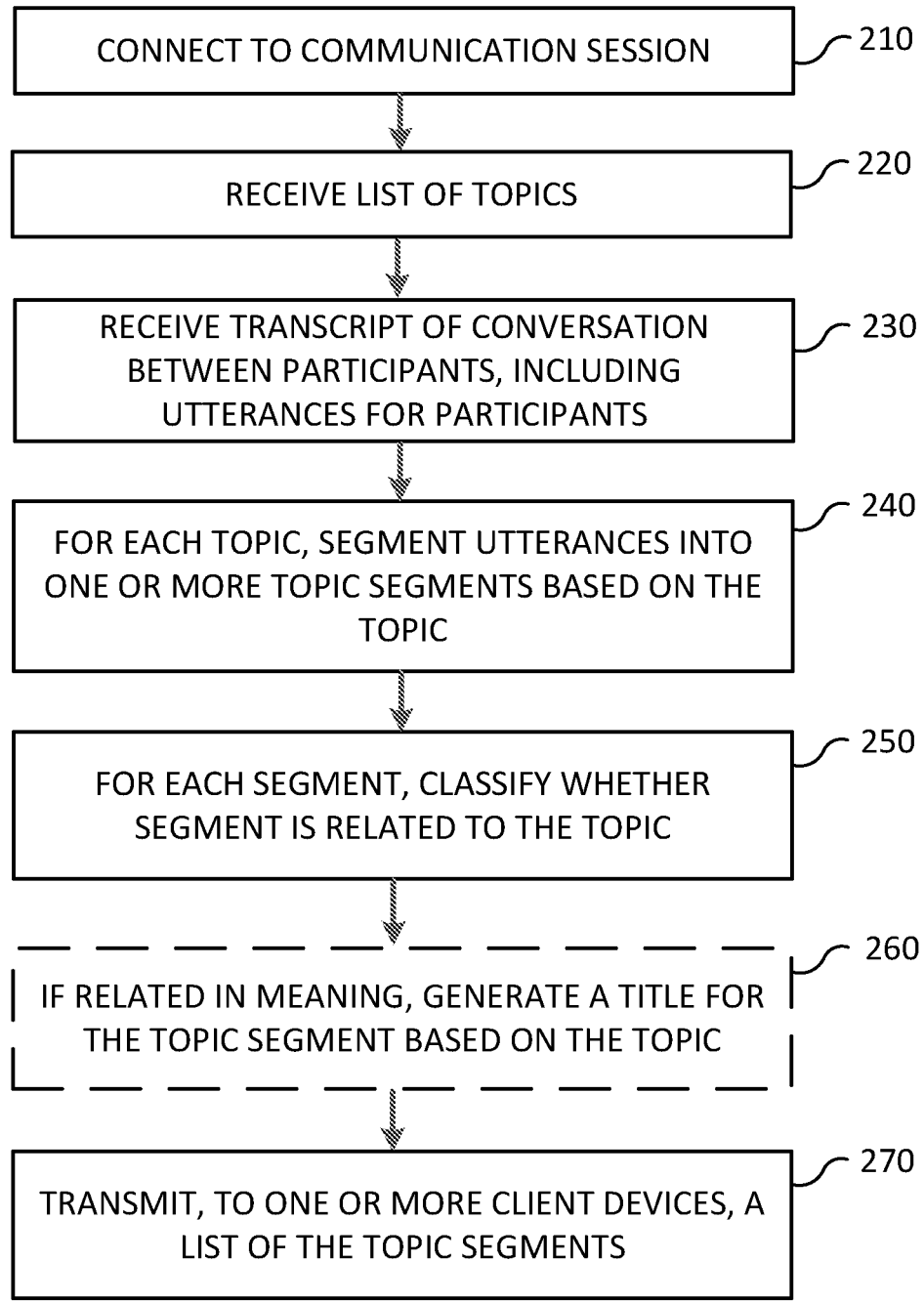
FIG. 2 is a flow chart illustrating an exemplary method that may be performed in some embodiments.

In an embodiment, the processing engine 102 may perform the exemplary method of FIG. 2 or other method herein and, as a result, provide dynamically generated topic segments for a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a transcript repository 130, topics repository 132, and/or results repository 134. The optional repositories function to store and/or maintain, respectively, a transcript for the communication session; submitted lists of topics for the communication session; and topic segment results for the communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
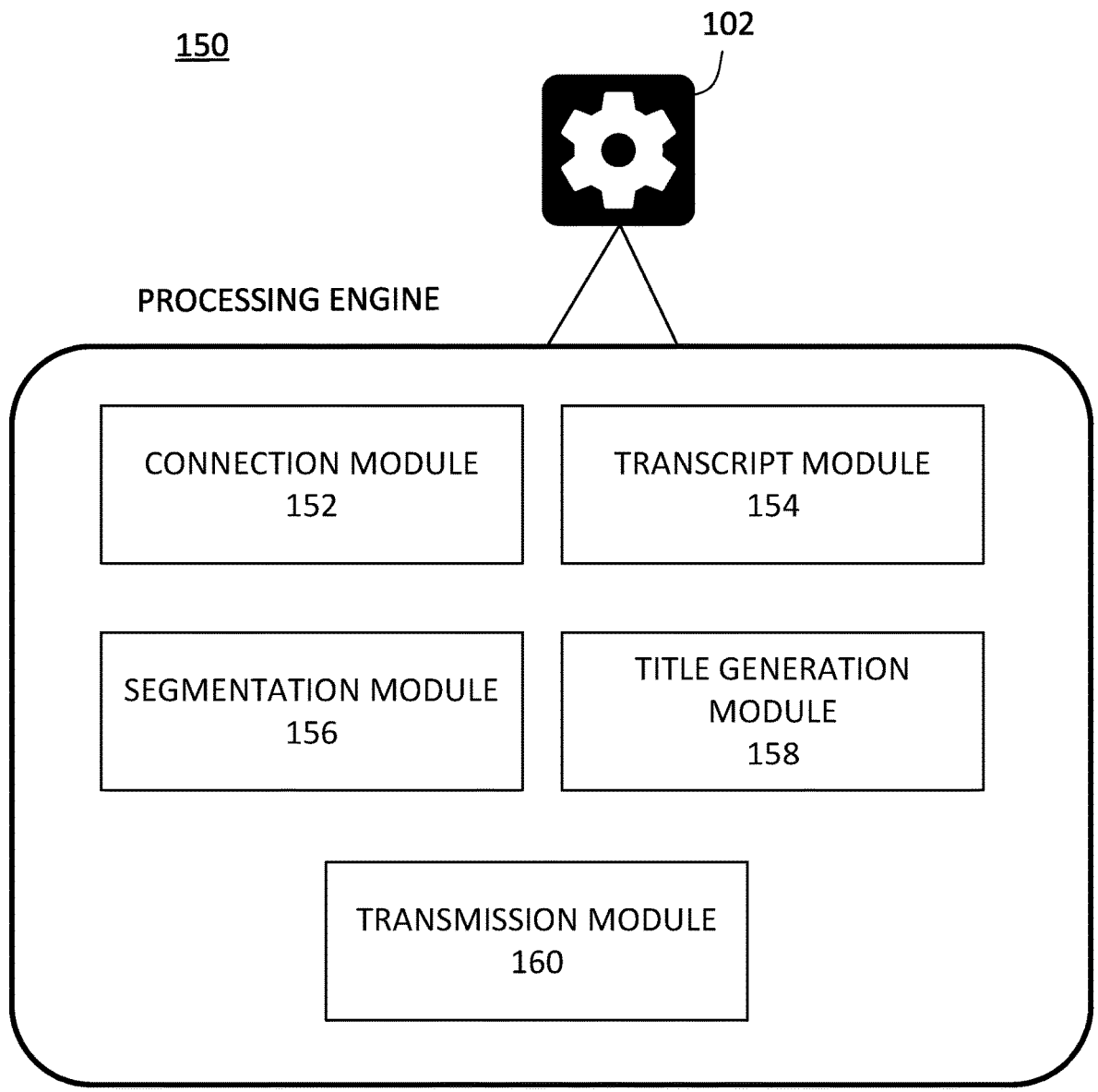
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants.

Receiving module 154 functions to receive a list of topics and transcript of a conversation between the participants produced during the communication session. The transcript includes timestamps for a number of utterances associated with speaking participants.

Segmentation module 156 functions to segment the utterances into one or more topic segments based on each topic in the list of topics.

Classification module 158 functions to classify whether each of the topic segments is related to each topic.

Transmission module 160 functions to transmit, to one or more client devices, a list of the topic segments for the communication session.

The above modules and their functions will be described in further detail in relation to an exemplary method below.

FIG. 2A is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

In some embodiments, the system receives an indication that the communication session has ended. When a meeting or other session is over, the system can identify topic segments and discuss each of the topics that could be found within the meeting. The system does not have any knowledge of the topics within the meeting in advance, aside from having access to a list of topics which may or may not be present within the meeting.

At step 220, the system receives a list of topics. In some embodiments, the system receives the list of topics from a client device associated with an authorized user. An authorized user may be, e.g., a participant of the communication session, an account administrator, a host of the communication session, an administrator or authorized representative of an entity or organization, or any other suitable authorized user. In some embodiments, authorization can be based on permission being granted to a user with some authority over at least a subset of the participants of the communication session who may have access to, e.g., the communication session, analytics data or recordings related to the session, or any other suitable data related to the communication session.

In some embodiments, the list of topics may be a predefined list of topics. The list may be composed of a multitude (i.e., two or more) of topics. The topics may be, e.g., words, phrases, alphanumeric characters, or any other suitable string or series of characters. A list of topics provided may include, for example, "Greeting", "Customer Info", "Product", "Demo", "Pricing/License", "Account", "General Discussion", and "Closing". A topic may be, for example, a product or service name, brand or company name, industry terms of art, or any other word or phrase which may be submitted as part of a list of topics. In some embodiments, only short phrases may be used, and the number of words in a particular phrase may be limited to a certain amount.

At step 230, the system receives a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

At step 240, for each topic in the list of topics, the system segments the utterances into one or more topic segments based on the topic. The topic segmentation process is a key component of the system herein, and functions to segment a meeting into sections. In some embodiments, linear segmentation is used, with the goal of identifying major boundaries in a coarse-grained fashion. In some embodiments, for each topic, the system determines segments (if any) where the topic is discussed. This includes at least 1) finding the topic within the segment, and 2) finding the starting point and ending point of that segment. In various embodiments, finding the topic may be performed first, and finding the starting point and ending point of that segment may be performed second. In some embodiments, these steps may instead be performed in the opposite order, or concurrently to one another.

In some embodiments, segmenting the utterances into topic segments includes the step of topic matching, wherein the system matches one or more utterances to each topic. In some embodiments, the system performs topic matching using similarity match techniques. In some embodiments, similarity match techniques involve embedding the utterances from the transcript and the topics from the list of topics, then obtaining the vector to represent the utterance and topics. The system then calculates the distance of the utterance and the topic vector to obtain a similarity score. In various embodiments, any of a number of embedding methods may be used. One example of an embedding architecture which may be used is "sentence-bert". In some embodiments, at the embedding level, the system may embed one or more of utterances, sentences, words, or any other discrete unit from the transcript which may be suited for embedding.

In some embodiments, sentence level embedding is used for a similarity match. In some embodiments, the system performs one or more of: splitting utterances into sentences (e.g., where one utterance is split into three sentences);

embedding sentences; embedding topics; and calculating the cosine distance as a similarity score. For example:

sentence1: {topic1: 0.8, topic2: 0.1, topic3: 0.04}
sentence2: {topic1: 0.5, topic2: 0.2, topic3: 0.1}
sentence3: {topic1: 0.4, topic2: 0.4, topic3: 0.2}

The system may then merge the sentences similarity into an utterance similarity. For example:

utterance: {topic1: 0.8, topic2: 0.4, topic3: 0.2}

The system may then filter the result by a similarity threshold:

threshold=0.7
utterance: {topic1: 0.8}

In some embodiments, the system may perform topic matching via exact match techniques. In some embodiments, exact match techniques involve comparing the utterance string and topic string. If the topic is covered in the utterance, then the system determines that a match is found.

In some embodiments, after topic matching is completed, utterance boundary detection is performed. In some embodiments, utterance boundary detection involves, for the matched utterance, finding the boundary for matched utterances so that the topic is not assigned to utterances, but rather to utterance segments. In various embodiments, one of several methods to obtain the utterance segments may be used.

In some embodiments, a text tiling algorithm may be employed for utterance boundary detection. In some embodiments, text tiling involves comparing adjacent pairs of text blocks for overall lexical similarity. This involves a lexical score being computed for every sentence or utterance. The sentences or utterances are grouped into blocks of size k. The more words the blocks have in common, the higher the lexical score at the gap between them. If a low lexical score is preceded by and followed by high lexical scores, the system assumes that this indicates a shift in vocabulary corresponding to a subtopic change, i.e., an utterance boundary has been detected. In some embodiments, the blocks act as moving windows over the text of the transcript. The lexical similarity scores may be computed as the inner product of two vectors, where a vector contains the number of times each lexical item occurs in its corresponding block. The inner product may also be normalized to make the score fall between 0 and 1.

In some embodiments of text tiling, the utterances are tokenized, stemmed, and divided into windows of a fixed width. Moving across the utterances, the lexical similarity is then calculated for each pair of adjacent windows, using the cosine distance between their lexical frequency vectors. In some embodiments, the resulting curve is then smoothed, and local minima are found by calculating a depth score for each point based on its relative depth below its nearest peaks on either side. Points with the highest depth scores (i.e., the deepest troughs in the smoothed similarity curve) are then taken as the hypothesized boundaries.

In one example of a semantic text tiling algorithm, first utterance-level segmentation is performed; then the system encodes utterances with a sentence transformer; then the system represents a window with maxpooling of the utterance embeddings; then the system applies smoothing.

In another example of a semantic text tiling algorithm, first the system performs sentence-level segmentation. This is performed by separating the utterances into sentences, with special handling of sentences of length less than or equal to 3 (combined with neighboring sentences). After the sentence boundaries are found, the system converts them into utterance boundaries. Next, the system represents a window by concatenating sentences in the window and obtaining embeddings with the sentence transformer. No smoothing is performed in this example.

In some embodiments, the output of the segmentation process is a number of segments, each with different spans (e.g., lines of the transcript, or starting and ending timestamps) for each topic.

At step 250, for each of the topic segments, the system classifies whether the topic segment is related to each topic. In some embodiments, the goal of this classification is to classify whether or not an utterance belongs to a discussion about one or more topics, and if so, which of those topics it belongs to, without the system having prior knowledge about what those topics are, since no fixed topics are in place. In some embodiments, the classification is performed via similarity or relatedness thresholding. In some embodiments, one or more pre-specified keywords or terms are used which the meeting features. In some embodiments, one or more language models are used.

In some embodiments, zero-shot topic classification is employed for this classification task. The goal of zero-shot topic classification is to make use of a pre-trained model within any additional fine-tuning being needed on a task-specific corpus. In some embodiments, natural language inference ("NLI") is employed to accomplish this, using a zero-shot framework. NLI, sometimes called "text entailment", involves the task of determining whether a "hypothesis" is true (i.e., entailment), false (i.e., contradiction), or undetermined (i.e., neutral), given a "premise". The (premise, hypothesis) pairs may be fed into a cross-encoder configured to learn how to predict one of the three labels. In some embodiments, a simple method for performing this zero-shot text classification is to feed in the sequence to be classified as a "premise", along with the "hypothesis" that the text is about the topic. For example, if the utterance is, "how much would it be for both of those products?" and we want to know if this utterance is relating to the topic "pricing", then the system can feed in the premise-hypothesis pair:

premise="How much would it be for both of those products?
hypothesis="This text is about pricing."

In some embodiments, a probability estimate of the hypothesis being true can be obtained by removing the neutral score, and feeding the contradiction and entailment scores to a softmax.

In some embodiments, since each utterance can belong to multiple topic labels, each of the topics are handled separately and independently, and at least a subset of the topic segments may (but not necessarily will) overlap with one or more of the other topic segments. In other words, for each (utterance, topic) pair, the system determines whether the utterance is a part of the discussion that is about the topic. In some embodiments, the system feeds each of the segments into the classifier, as well as each of the topics, and determines whether the text sequence is about the topic. In some embodiments, after the segmentation is performed in step 240, the system concatenates the utterances within each segment, then applies a zero-shot topic classifier to every (segment, topic) pair.

At optional step 260, in some embodiments, the system generates a title for each topic segment based on the topic if it is related in meaning. In some embodiments, the title is a text string representing, or matching, the text of the topic that is related in meaning to the topic segment.

At step 270, the system transmits, to one or more client devices, a list of the topic segments. In some embodiments, prior to transmitting the list of the topic segments to the client devices, the system formats the list of topic segments into a structured data markup format, such as, e.g., JSON format. In some embodiments, the system transmits a starting timestamp and ending timestamp for each of the topic segments, or span (e.g., lines of the transcript) where the topic segment is located within the transcript.

In some embodiments, the list of the topic segments may be presented in the form of various applications, or additional data making use of the topic segments may be used. In some embodiments, the system transmits a topic summary for a topic, with the topic summary including one or more utterances from topic segments related to the topic. In some embodiments, the system transmits, to one or more client devices, one or more utterance results based on a search for the topic within the communication session. In some embodiments, the system transmits analytics data related to one or more topics within the communication session.

Figure 3:
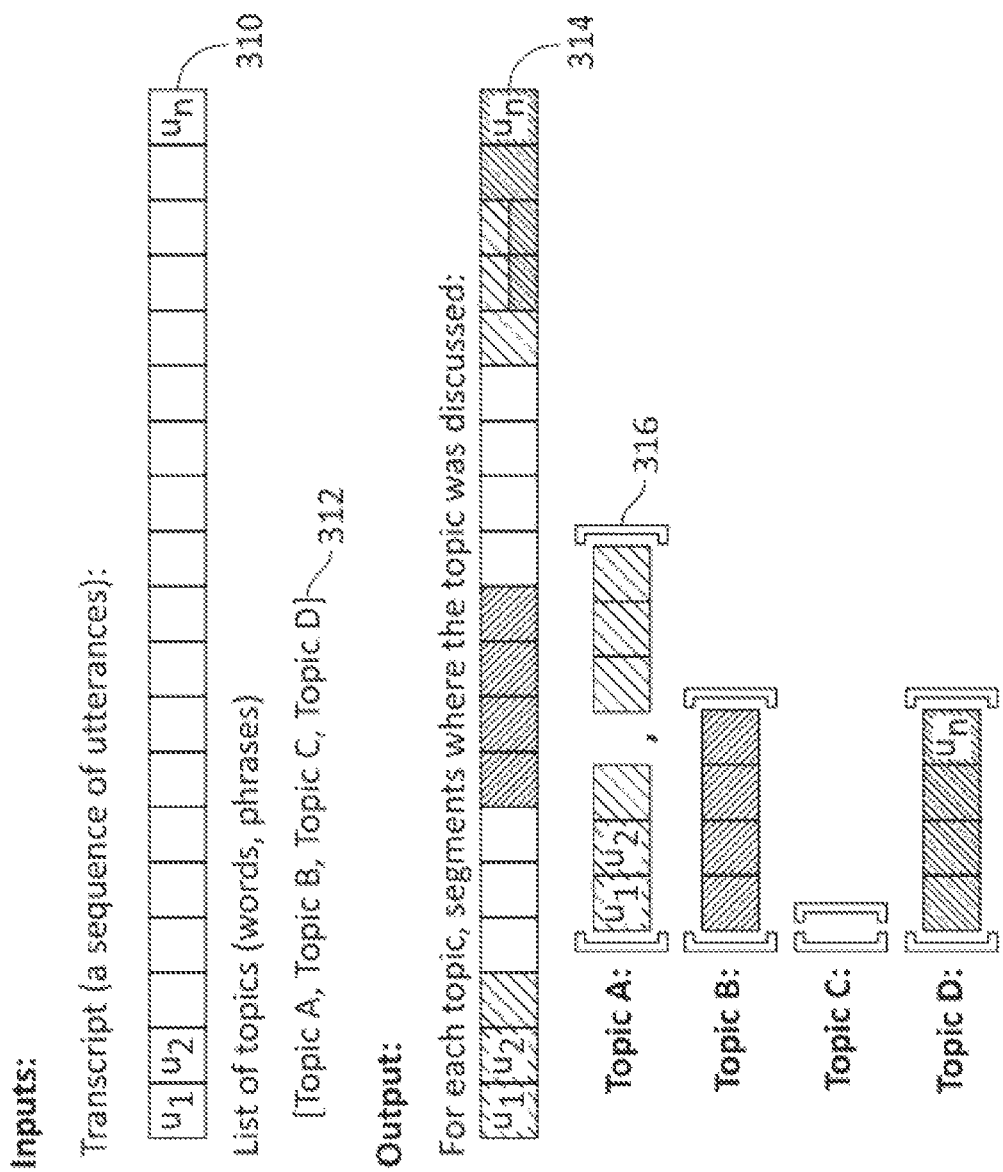
FIG. 3 is a diagram illustrating inputs and output for an exemplary method that may be performed in some embodiments.

FIG. 3 is a diagram illustrating inputs and output for an exemplary method that may be performed in some embodiments. An input to the system may be a transcript consisting of a sequence of utterances 310, with n number of utterances u within the transcript. Another input to the system is a list of topics 312, which may be words or phrases. The list of topics 312 may be in the format of, for example, [Topic A, Topic B, Topic C, Topic D].

An output to the system may be, for each topic, segments where the topic was discussed, as in the sequence of segments 314. One topic is shown to be discussed in the first three segments, another topic is shown to be discussed in the seventh through tenth segments, and so on. Some individual segments may discuss two or more different topics. Some individual topics may be discussed in two or more different segments. Some topics may not be discussed in any segment.

Figure 4A:
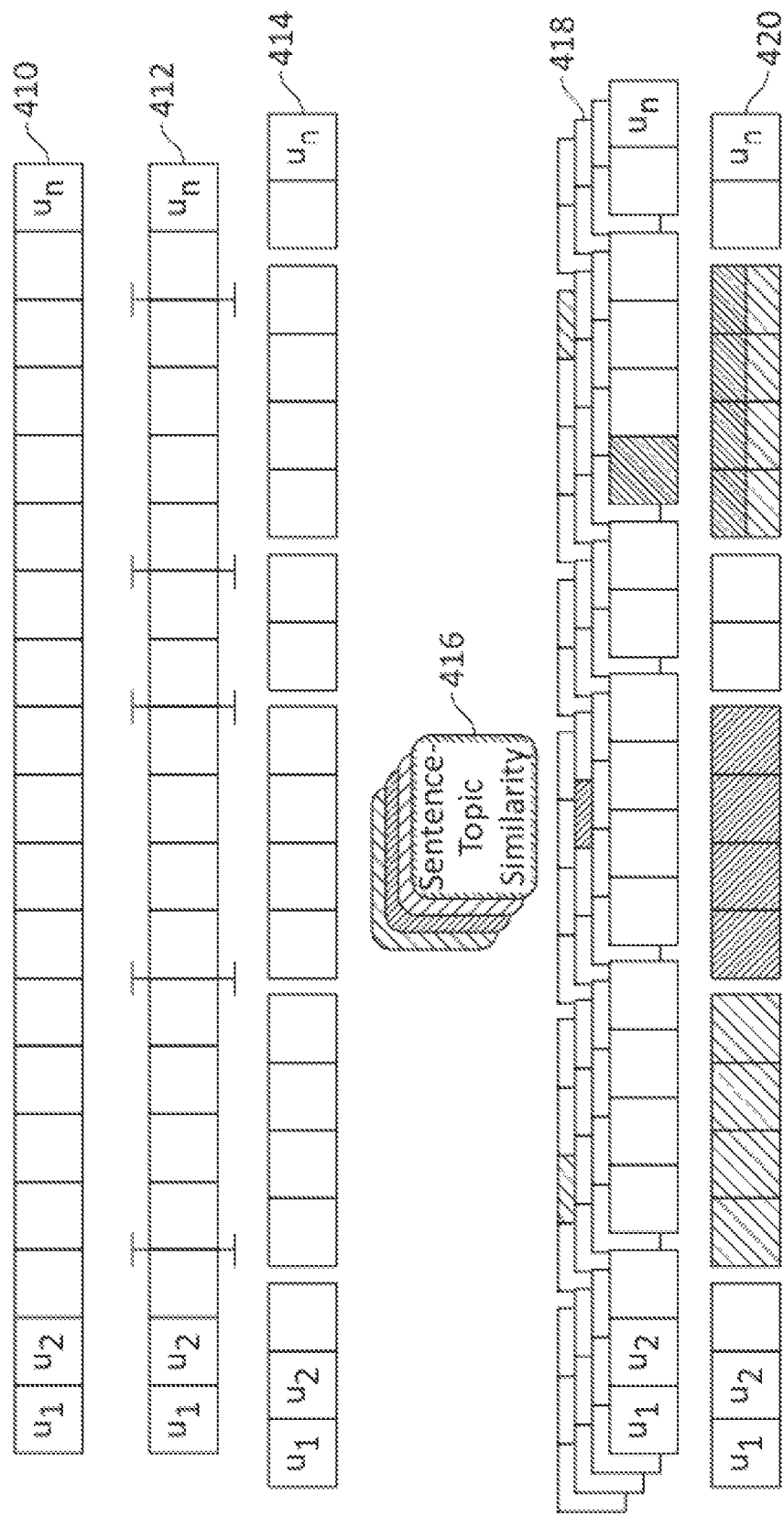
FIG. 4A is a diagram illustrating one exemplary method for topic segmentation based on sentence topic similarity, in accordance with some embodiments.

FIG. 4A is a diagram illustrating one exemplary method for topic segmentation based on sentence topic similarity, in accordance with some embodiments.

In sentence topic similarity, a segment may include a sentence that is semantically similar enough to the topic. In sequence of utterances 410, a transcript is shown with n number of utterances u. In sequence 412, text tiling is performed, independently of any detected topics, to detect utterance boundaries. A relatively small window size (e.g., k=6) is used, and no thresholding is performed to favor shorter segments. In sequence 414, the boundaries are used as a basis for separating the utterances into a series of segments. Sentence-topic similarity 416 is then applied, with utterances and topics used as inputs. In sequence 418, each of the topics is independently identified in one or more utterances within the transcript. In sequence 420, lexical similarity scores are obtained as described above by comparing blocks of utterances, and one or more segments is determined to contain utterances that cover the topic.

Figure 4B:
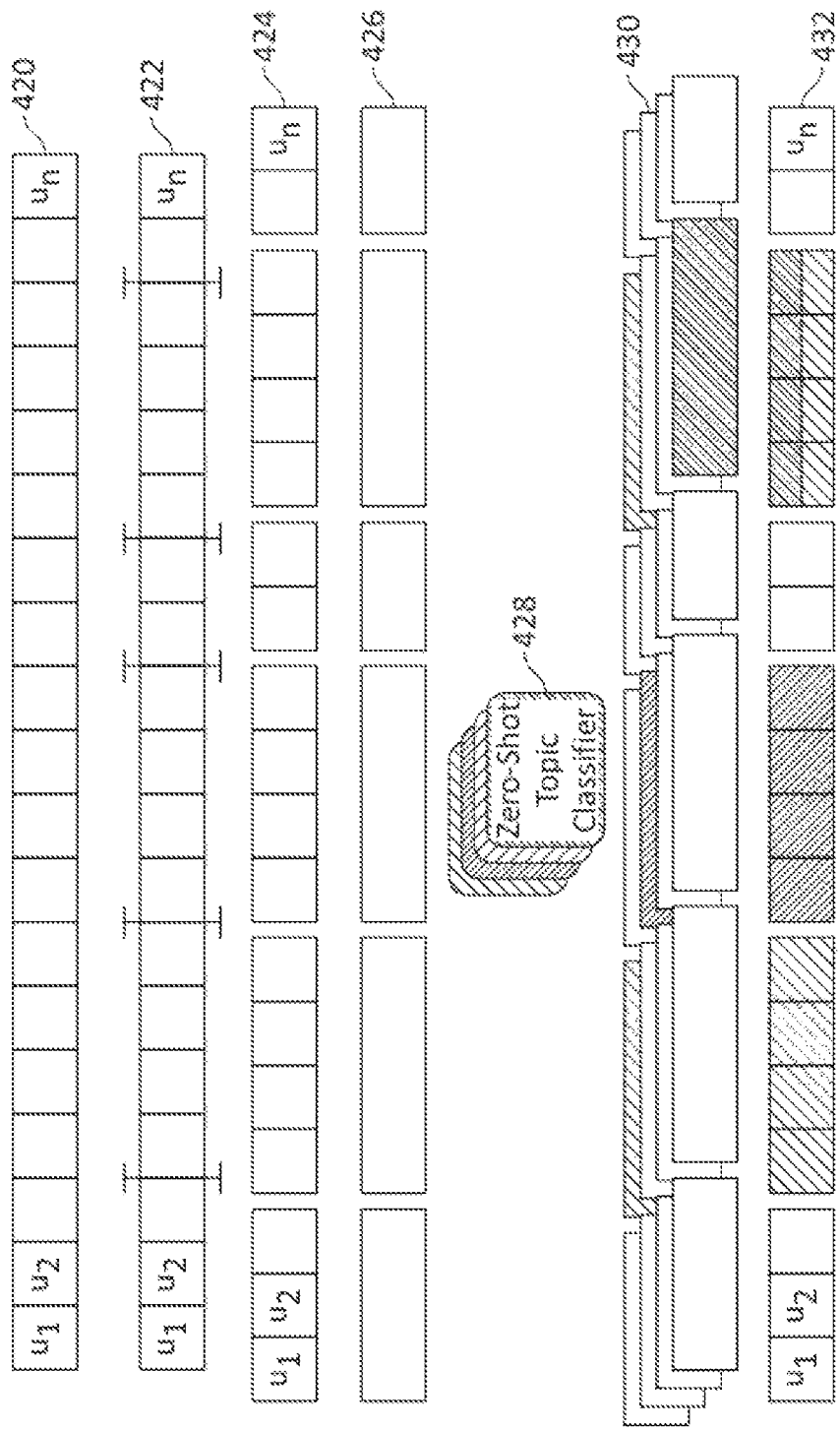
FIG. 4B is a diagram illustrating one exemplary method for topic classification based on a zero-shot topic classifier, in accordance with some embodiments.

FIG. 4B is a diagram illustrating one exemplary method for topic classification based on a zero-shot topic classifier, in accordance with some embodiments.

In sequences 421, 422, and 424, the sequence of utterances is segmented into a number of segments, as described above with respect to FIG. 4A. In sequence 426, only the segments are used going forward, not the utterances. A zero-shot topic classifier 428 is then applied, with the topics and segments as inputs. For each topic treated independently, each segment is examined to determine whether the segment is about the topic. If yes, then the segment is determined to be related to the topic. In some embodiments, a label is applied to the segment with the text of the topic, which can serve as a title for the topic segment. The list of topic segments is then transmitted to one or more client devices.

FIG. 5A is a diagram illustrating an example of topics detected in an excerpt of a transcript, in accordance with some embodiments. Each paragraph may represent a segment consisting of multiple utterances. In the first segment, "meet" and "meeting" are identified as part of the topic "meeting". In the second segment, "materials" is identified as a topic, as well as "markets" and "materials". No topic is identified in the third segment. "Market" is identified as a topic in the fourth segment.

FIG. 5B is a diagram illustrating an example of utterances detected in an excerpt of a transcript, in accordance with some embodiments. The transcript excerpt from FIG. 5A is shown as a series of utterances. These utterances are the input to one or more methods for segmentation and classification.

Figure 5C:
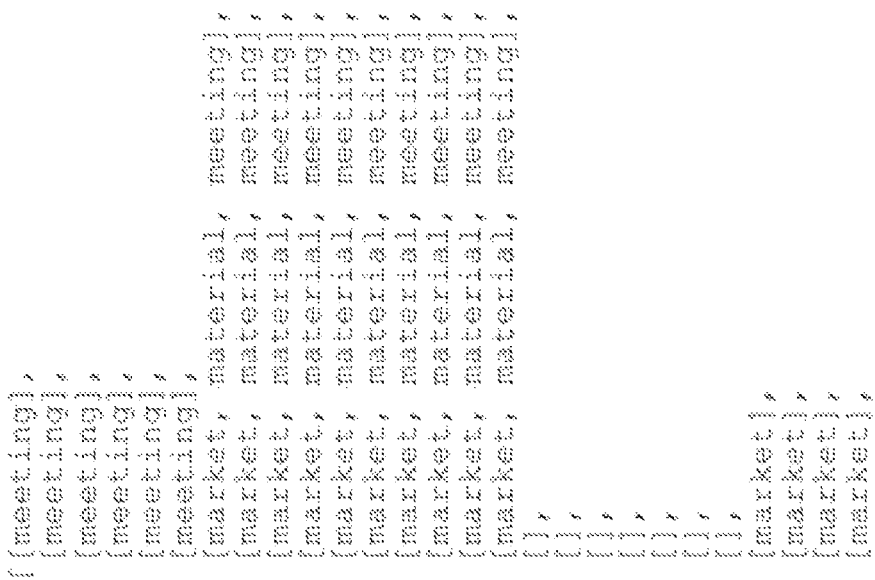
FIG. 5C is a diagram illustrating an example of labels generated for topic segments, in accordance with some embodiments.

FIG. 5C is a diagram illustrating an example of labels generated for topic segments, in accordance with some embodiments. The example shows a series of topics which have been identified within segments. The segments are identified as being about certain topics. A segment may be about multiple topics, as in the second segment, which is about "market", "material", and "meeting". The segments have automatically been labeled or titled based on the topics discussed within the segments.

Figure 6:
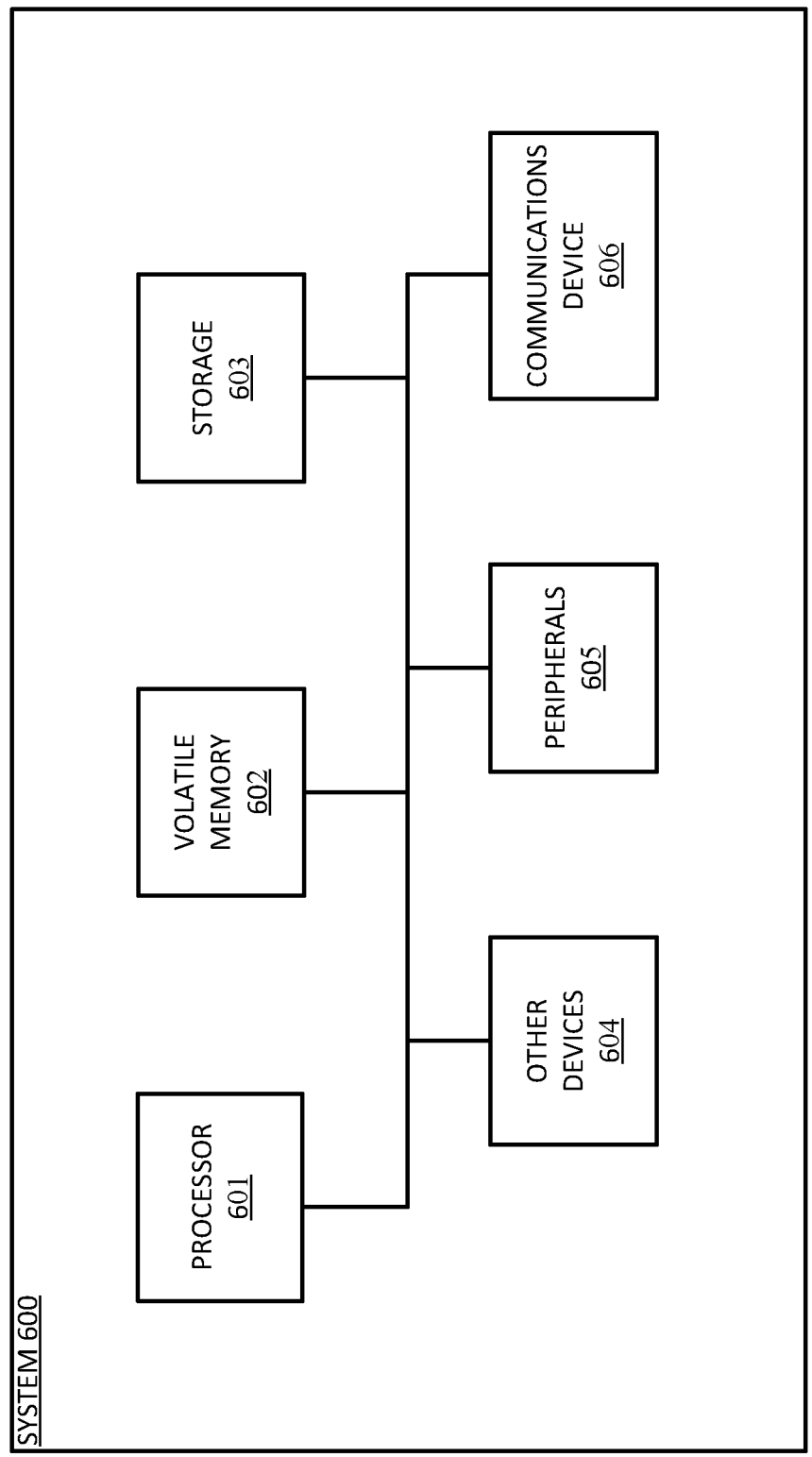
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Peripherals 605 may include removable media devices such as CD-R and DVD-R recorders/players. Communications device 606 may connect the computer 100 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1. A method, comprising: connecting to a communication session with a plurality of participants; receiving a list of topics; receiving a transcript of a conversation between the participants produced during the communication session, the transcript comprising timestamps for a plurality of utterances associated with speaking participants; for each topic in the list of topics, segmenting the utterances into one or more topic segments based on the topic; for each of the segments, classifying whether the topic segment is related to the topic; and transmitting, to one or more client devices, a list of the topic segments for the communication session.

Example 2. The method of example 1, further comprising: if the segment is related to the topic, generating a title for the topic segment based on the topic.

Example 3. The method of any of examples 1-2, wherein the list of topics is received from a client device associated with an authorized user.

Example 4. The method of any of examples 1-3, wherein the segmenting is performed via one or more text tiling techniques.

Example 5. The method of any of examples 1-4, wherein the segmenting comprises: shifting a window over the utterances in the transcript one word at a time with a pre-specified window size to generate two blocks of utterances per each shift of the window; at each shift of the window, comparing the two blocks of the utterances to determine whether the blocks are semantically similar; and defining a boundary between two topic segments when two blocks of utterances are semantically different.

Example 6. The method of any of examples 1-5, wherein at least a subset of the topic segments overlap with one or more of the other topic segments.

Example 7. The method of any of examples 1-6, wherein the topic segments comprise a span of the transcript comprising one or more lines or utterances.

Example 8. The method of any of examples 1-7, wherein classifying whether the topic segment is related to the topic is performed via one or more zero-shot text classification techniques.

Example 9. The method of any of examples 1-8, wherein classifying whether the topic segment is related to the topic comprises meeting or exceeding a relatedness threshold.

Example 10. The method of any of examples 1-9, wherein transmitting the list of the topic segments to the client devices comprises transmitting a starting timestamp and ending timestamp for each of the topic segments.

Example 11. The method of any of examples 1-10, wherein the segmentation is performed via linear segmentation for each topic.

Example 12. The method of any of examples 1-11, wherein classifying whether the topic segment is related to the topic is based on one or more language models.

Example 13. The method of any of examples 1-12, wherein classifying whether the topic segment is related to the topic is based on one or more keywords.

Example 14. The method of any of examples 1-13, further comprising: transmitting, to one or more client devices, a topic summary for a topic, the topic summary comprising one or more utterances from topic segments related to the topic.

Example 15. The method of any of examples 1-14, further comprising: transmitting, to one or more client devices, one or more utterance results based on a search for the topic within the communication session.

Example 16. The method of any of examples 1-15, further comprising: transmitting, to one or more client devices, analytics data related to one or more topics within the communication session.

Example 17. The method of any of examples 1-16, wherein the segmenting comprises one or more topic matching techniques.

Example 18. The method of any of examples 1-17, wherein the segmenting comprises one or more utterance boundary detection techniques.

Example 19. A communication system comprising one or more processors configured to perform the operations of: connecting to a communication session with a plurality of participants; receiving a list of topics; receiving a transcript of a conversation between the participants produced during the communication session, the transcript comprising timestamps for a plurality of utterances associated with speaking participants; for each topic in the list of topics, segmenting the utterances into one or more topic segments based on the topic; for each of the segments, classifying whether the topic segment is related to the topic; and transmitting, to one or more client devices, a list of the topic segments for the communication session.

Example 20. The communication system of example 19, wherein the one or more processors are further configured to perform the operation of: if the segment is related to the topic, generating a title for the topic segment based on the topic.

Example 21. The communication system of any of examples 19-20, wherein the list of topics is received from a client device associated with an authorized user.

Example 22. The communication system of any of examples 19-21, wherein the segmenting is performed via one or more text tiling techniques.

Example 23. The communication system of any of examples 19-22, wherein the segmenting comprises: shifting a window over the utterances in the transcript one word at a time with a pre-specified window size to generate two blocks of utterances per each shift of the window; at each shift of the window, comparing the two blocks of the utterances to determine whether the blocks are semantically similar; and defining a boundary between two topic segments when two blocks of utterances are semantically different.

Example 24. The communication system of any of examples 19-23, wherein at least a subset of the topic segments overlap with one or more of the other topic segments.

Example 25. The communication system of any of examples 19-24, wherein the topic segments comprise a span of the transcript comprising one or more lines or utterances.

Example 26. The communication system of any of examples 19-25, wherein classifying whether the topic segment is related to the topic is performed via one or more zero-shot text classification techniques.

Example 27. The communication system of any of examples 19-26, wherein classifying whether the topic segment is related to the topic comprises meeting or exceeding a relatedness threshold.

Example 28. The communication system of any of examples 19-27, wherein transmitting the list of the topic segments to the client devices comprises transmitting a starting timestamp and ending timestamp for each of the topic segments.

Example 29. The communication system of any of examples 19-28, wherein the segmentation is performed via linear segmentation for each topic.

Example 30. The communication system of any of examples 19-29, wherein classifying whether the topic segment is related to the topic is based on one or more language models.

Example 31. The communication system of any of examples 19-30, wherein classifying whether the topic segment is related to the topic is based on one or more keywords.

Example 32. The communication system of any of examples 19-31, wherein the one or more processors are further configured to perform the operation of: transmitting, to one or more client devices, a topic summary for a topic, the topic summary comprising one or more utterances from topic segments related to the topic.

Example 33. The communication system of any of examples 19-32, wherein the one or more processors are further configured to perform the operation of: transmitting, to one or more client devices, one or more utterance results based on a search for the topic within the communication session.

Example 34. The communication system of any of examples 19-33, wherein the one or more processors are further configured to perform the operation of: transmitting, to one or more client devices, analytics data related to one or more topics within the communication session.

Example 35. The communication system of any of examples 19-34, wherein the segmenting comprises one or more topic matching techniques.

Example 36. The communication system of any of examples 19-35, wherein the segmenting comprises one or more utterance boundary detection techniques.

Example 37. A non-transitory computer-readable medium containing instructions for generating a note with session content from a communication session, comprising: instructions for connecting to a communication session with a plurality of participants; instructions for receiving a list of topics; instructions for receiving a transcript of a conversation between the participants produced during the communication session, the transcript comprising timestamps for a plurality of utterances associated with speaking participants; for each topic in the list of topics, instructions for segmenting the utterances into one or more topic segments based on the topic; for each of the segments, instructions for classifying whether the topic segment is related to the topic; and instructions for transmitting, to one or more client devices, a list of the topic segments for the communication session.

Example 38. The non-transitory computer-readable medium of example 37, further comprising: if the segment is related to the topic, generating a title for the topic segment based on the topic.

Example 39. The non-transitory computer-readable medium of any of examples 37-38, wherein the list of topics is received from a client device associated with an authorized user.

Example 40. The non-transitory computer-readable medium of any of examples 37-39, wherein the segmenting is performed via one or more text tiling techniques.

Example 41. The non-transitory computer-readable medium of any of examples 37-40, wherein the segmenting comprises: shifting a window over the utterances in the transcript one word at a time with a pre-specified window size to generate two blocks of utterances per each shift of the window; at each shift of the window, comparing the two blocks of the utterances to determine whether the blocks are semantically similar; and defining a boundary between two topic segments when two blocks of utterances are semantically different.

Example 42. The non-transitory computer-readable medium of any of examples 37-41, wherein at least a subset of the topic segments overlap with one or more of the other topic segments.

Example 43. The non-transitory computer-readable medium of any of examples 37-42, wherein the topic segments comprise a span of the transcript comprising one or more lines or utterances.

Example 44. The non-transitory computer-readable medium of any of examples 37-43, wherein classifying whether the topic segment is related to the topic is performed via one or more zero-shot text classification techniques.

Example 45. The non-transitory computer-readable medium of any of examples 37-44, wherein classifying whether the topic segment is related to the topic comprises meeting or exceeding a relatedness threshold.

Example 46. The non-transitory computer-readable medium of any of examples 37-45, wherein transmitting the list of the topic segments to the client devices comprises transmitting a starting timestamp and ending timestamp for each of the topic segments.

Example 47. The non-transitory computer-readable medium of any of examples 37-46, wherein the segmentation is performed via linear segmentation for each topic.

Example 48. The non-transitory computer-readable medium of any of examples 37-47, wherein classifying whether the topic segment is related to the topic is based on one or more language models.

Example 49. The non-transitory computer-readable medium of any of examples 37-48, wherein classifying whether the topic segment is related to the topic is based on one or more keywords.

Example 50. The non-transitory computer-readable medium of any of examples 37-49, further comprising: transmitting, to one or more client devices, a topic summary for a topic, the topic summary comprising one or more utterances from topic segments related to the topic.

Example 51. The non-transitory computer-readable medium of any of examples 37-50, further comprising: transmitting, to one or more client devices, one or more utterance results based on a search for the topic within the communication session.

Example 52. The non-transitory computer-readable medium of any of examples 37-51, further comprising: transmitting, to one or more client devices, analytics data related to one or more topics within the communication session.

Example 53. The non-transitory computer-readable medium of any of examples 37-52, wherein the segmenting comprises one or more topic matching techniques.

Example 54. The non-transitory computer-readable medium of any of examples 37-53, wherein the segmenting comprises one or more utterance boundary detection techniques.

An aspect includes a method that includes receiving a transcript that includes one or more transcriptions of utterances associated with a list of topics. The method may include, for each topic in the list of topics, segmenting the utterances into one or more topic segments based on the topic. The segmenting may include determining an utterance boundary based on a lexical score associated with an adjacent pair of text blocks. The method may include, for each of the one or more topic segments, classifying whether the respective topic segment is related to the topic. The method may include, for each of the one or more topic segments, determining that the respective topic segment is related to the topic. The method may include transmitting, to one or more client devices, a list of topic segments that are related to the topic.

An aspect may include a system that comprises one or more processors. The one or more processors may be configured to receive a transcript that includes one or more transcriptions of utterances associated with a list of topics. The one or more processors may be configured to, for each topic in the list of topics, segment the utterances into one or more topic segments based on the topic. The segmentation may be based on a determination of an utterance boundary that is based on a lexical score associated with an adjacent pair of text blocks. The one or more processors may be configured to, for each of the one or more topic segments, classify whether the respective topic segment is related to the topic. The one or more processors may be configured to, for each of the one or more topic segments, determine that the respective topic segment is related to the topic. The one or more processors may be configured to transmit, to one or more client devices, a list of the topic segments that are related to the topic.

An aspect may include a non-transitory computer-readable medium comprising instructions that when executed by one or more processors, cause the one or more processors to perform operations. The operations may include receiving a transcript that includes one or more transcriptions of utterances associated with a list of topics. The operations may include, for each topic in the list of topics, segmenting the utterances into one or more topic segments based on the topic. The segmenting may include determining an utterance boundary based on a lexical score associated with an adjacent pair of text blocks. The operations may include, for each of the one or more topic segments, classifying whether the respective topic segment is related to the topic. The operations may include, for each of the one or more topic segments, determining that the respective topic segment is related to the topic. The operations may include transmitting, to one or more client devices, a list of topic segments that are related to the topic.

In one or more aspects, a title for the topic segment may be generated based on the topic. In one or more aspects, the list of topics may be received from a client device. In one or more aspects, the segmenting may be performed via one or more text tiling techniques. In one or more aspects, the segmenting may include shifting a window over the utterances in the transcript one word at a time with a pre-specified window size to generate two blocks of utterances per each shift of the window. In one of more aspects, at each shift of the window, the two blocks of the utterances may be compared to determine whether the blocks are semantically similar. In one or more aspects, a boundary between two topic segments may be defined when two blocks of utterances are semantically different. In one or more aspects, a subset of the topic segments may overlap with one or more of the other topic segments. In one or more aspects, the topic segments may comprise a span of the transcript comprising one or more lines of utterances. In one or more aspects, classifying whether the respective topic segment is related to the topic may be performed via one or more zero-shot text classification techniques. In one or more aspects, the classification of whether the respective topic segment is related to the topic may be based on a relatedness threshold. In one or more aspects, a starting timestamp and an ending timestamp may be transmitted for each of the topic segments. In one or more aspects, the utterances may be segmented via a linear segmentation for each topic. In one or more aspects, the classification of whether the topic segment is related to the topic may be based on one or more language models. In one or more aspects, a topic summary for a topic may be transmitted to one or more client devices. The topic summary may include one or more utterances from topic segments related to the topic. In one or more aspects, the classification of whether the topic segment is related to the topic may be based on one or more keywords. In one or more aspects, one or more utterance results based on a search for the topic within the communication session may be transmitted to one or more client devices. In one or more aspects, analytics data related to one or more topics within the communication session may be transmitted to one or more client devices. In one or more aspects, the segmenting may include one or more topic matching techniques. In one or more aspects, the segmenting may include one or more utterance boundary detection techniques.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   receiving a transcript that includes one or more transcriptions of utterances associated with a list of topics;
   for each topic in the list of topics, segmenting the utterances into one or more topic segments based on a determination of an utterance boundary based on a lexical score that is a vector product associated with an adjacent pair of text blocks, wherein a vector contains a number of times a lexical item occurs within a corresponding text block;
   for each of the one or more topic segments, determining whether a respective topic segment is related to a topic using one or more zero-shot text classification techniques; and
   transmitting, to one or more client devices, a list of topic segments that are related to the topic.

2. The method of claim 1, further comprising:
   generating a title for the respective topic segment based on the topic.

3. The method of claim 1, wherein the list of topics is received from a client device of the one or more client devices.

4. The method of claim 1, wherein the segmenting is performed via one or more text tiling techniques.

5. The method of claim 1, wherein the segmenting comprises:
   shifting a window over the utterances in the transcript one word at a time with a pre-specified window size to generate two blocks of utterances per each shift of the window;
   at each shift of the window, comparing the two blocks of the utterances to determine whether the two blocks are semantically similar; and
   defining a boundary between two topic segments when two blocks of utterances are semantically different.

6. The method of claim 1, wherein at least a subset of the topic segments overlap with one or more of other topic segments.

7. The method of claim 1, wherein the one or more topic segments comprise a span of the transcript comprising one or more lines or utterances.

8. The method of claim 1, further comprising:
   classifying whether the one or more topic segments are related to the topic based on one or more language models.

9. A system comprising:
   one or more processors configured to:
   receive a transcript that includes one or more transcriptions of utterances associated with a list of topics;
   for each topic in the list of topics, segment the utterances into one or more topic segments based on a determination of an utterance boundary that is based on a lexical score that is a vector product associated with an adjacent pair of text blocks, wherein a vector contains a number of times a lexical item occurs within a corresponding text block;
   for each of the one or more topic segments, determine whether a respective topic segment is related to a topic via one or more zero-shot text classification techniques; and
   transmit, to one or more client devices a list of topic segments that are related to the topic.

10. The system of claim 9, wherein the one or more processors are further configured to classify whether the respective topic segment is related to the topic based on a relatedness threshold.

11. The system of claim 9, wherein the one or more processors are configured to transmit a starting timestamp and ending timestamp for each of the one or more topic segments.

12. The system of claim 9, wherein the one or more processors are configured to segment the utterances via linear segmentation for each of the one or more topics.

13. The system of claim 9, wherein the one or more processors are configured to classify whether the one or more topic segments are related to the topic based on one or more language models.

14. The system of claim 9, wherein the one or more processors are configured to classify whether the one or more topic segments are related to the topic based on one or more keywords.

15. The system of claim 9, wherein the one or more processors are further configured to:
   transmit, to one or more client devices, a topic summary for a topic, the topic summary comprising one or more utterances from topic segments related to the topic.

16. A non-transitory computer-readable medium comprising instructions that when executed by one or more processors, causes the one or more processors to perform operations comprising:
   receiving a transcript that includes one or more transcriptions of utterances associated with a list of topics;
   for each topic in the list of topics, segmenting the utterances into one or more topic segments based on a determination of an utterance boundary based on a lexical score that is a vector product associated with an adjacent pair of text blocks, wherein a vector contains a number of times a lexical item occurs within a corresponding text block;
   for each of the one or more topic segments, determining whether a respective topic segment is related to a topic using one or more zero-shot text classification techniques; and
   transmitting, to one or more client devices, a list of topic segments that are related to the topic.

17. The non-transitory computer-readable medium of claim 16, wherein the one or more processors are further configured to perform operations comprising:
   transmitting, to one or more client devices, one or more utterance results based on a search for the topic within a communication session.

18. The non-transitory computer-readable medium of claim 16, wherein the one or more processors are further configured to perform operations comprising:

transmitting, to one or more client devices, analytics data related to one or more topics within a communication session.

19. The non-transitory computer-readable medium of claim 16, wherein the segmenting comprises one or more topic matching techniques.

20. The non-transitory computer-readable medium of claim 16, wherein the segmenting comprises one or more utterance boundary detection techniques.

\* \* \* \* \*